United States Patent Office 2,895,052
Patented July 14, 1959

2,895,052

DEVICE AND CIRCUIT FOR THE MEASUREMENT OF HIGH RESISTANCES

Louis L. Weisglass and Carl P. Weisglass, New York, N.Y.

Application July 13, 1955, Serial No. 521,726

3 Claims. (Cl. 250—83.6)

This invention relates to a system for measuring an energy source, and more particularly for deriving high resistance indication from a condenser coupled to a thermionic valve or electronic discharge tube for the measurements of high impedances such as high ohmic resistances, photoelectric currents, weak ionization currents or the like.

One of the objects of the invention is to discharge a charged condenser over a high ohmic resistor or other current leak of an energy source, and after the lower discharge potential has been detected by a thermionic valve or electronic discharge tube, to translate it into plate current, which in turn may actuate associated components of the circuit, contact means, such as relays to cause a recharge of the condenser and repetition of the cycle.

Another object of the invention is to discharge a charged condenser to a low level potential and to recharge it by means of a high positive and constant potential, whereby a thermionic tube is caused to operate as a rectifier for the charging current.

A further object of the invention is to cause under control of an electrical quantity to be measured, a predetermined number of condenser charges and discharges, whereby the number of recharging cycles over a period of time represents the integrating quantity of current as a function of time of the condenser discharges.

Further in accordance with the invention the recharging of the condenser to the high potential must be automatic and very accurate.

Several systems have already been disclosed which all present certain difficulties either in obtaining the necessary precision or in practical realization.

In German Patent No. 541,936, for example, the recharging of the measuring condenser is realized by a high tension inductive impulse. This impulse is generated by the secondary of a transformer, the primary of which is suddenly disconnected from its low voltage power supply. In this case it has been found extremely difficult, if not impossible, to make the contact action—which interrupts the current causing the inductive impulse—uniform and free from vibration so as to obtain a secondary impulse of constant magnitude.

While United States Patent No. 2,081,074 represents a certain improvement over the German system, in this case a constant voltage supply, negative with respect to the cathode of the thermionic valve, is directly impressed on the grid of the thermionic valve and also on the measuring condenser by means of a relay contact. If this contact is permanently connected to a highly insulated electrode, such as the control grid of a thermionic valve, this contact must be supported on high insulating material. The relay itself, therefore, will have to be placed in close proximity of the valve. This creates a space problem, which makes this system impractical in a number of important applications such as the evaluation of ionization currents.

It is therefore still another object of the invention, particularly in the application as an X-ray dosimeter, to maintain the dimensions of all associated parts next to the ionization chamber as small as possible, and to achieve this by providing a new system of recharging the measuring condenser.

A further object of the invention is to make the recharging accurate and automatic.

Still further an object of the invention is to free the proximity of the thermionic valve and ionization chamber from additional components, in order further to reduce the physical dimensions of this unit as far as possible.

These and other objects of the invention will be better understood in the following description and drawing, in which:

Fig. 1 represents certain principles of the invention in the form of a block diagram.

Fig. 2 represents a circuit diagram embodying certain features of the invention in greater detail.

In Fig. 1 part 1 represents the weak source of electrical energy to be measured by discharging across a shunt condenser 2. Condenser 2 is coupled to an electronic discharge tube 3 at one end, and at the other end to one terminal of a multi-potential battery or other well regulated D.C. voltage supply 4, containing sources 4', 4" and 4''' of different predetermined potentials.

Electronic tube 3 controls one or more relay devices which may be electromechanical or of the electronic type as schematically indicated at 5, and which in turn under control of a charge on condenser 2, causes voltage supply 4 to change the potential to the condenser 2 from one predetermined value to another; thereby changing the charge condition of condenser 2 and the operating condition of tube 3 and causing condenser 2 and the tube 3 and thereby relay 5 to return to a rest or initial condition, whereupon under control of a charge from source 1, condenser 2 and tube 3 again assume an operating condition thereby operating relay 5 and repeating the aforementioned cycle until the current charges produced by source 1 are evaluated in the form of a number of relay operations counted by a pulse counter 6.

Counter 6 is not directly controlled by relay 5 but over delay circuit 7 so that at the outset and at the start of the delay period, voltage supply 4' applied over condenser 2 to tube 3 is switched to voltage supply 4" thereby causing tube 3 to become a rectifier which does not permit discharge of condenser 2.

Thereafter and after the predetermined delay period of say 50 milliseconds and under control of such delay period and preferably also under control of relay 5, voltage supply 4 is caused again to furnish another predetermined voltage 4' to condenser 2 thus causing tube 3 to become non-conductive, thereby de-energizing relay 5 and causing condenser 2 to be returned to its initial condition and become ready for another measuring cycle.

In Fig. 2, electronic tube 8 is shown with a filament 9, a control electrode 10 and a plate 11. Filament 9 is heated from a supply voltage $P_f$ of a battery 12 over leads 13, 14. Control electrode 10 of tube 8 is a highly insulated grid electrode and free from photoelectric effects. Plate 11 is connected over line 15 to the coil 16 of an electromagnetic relay 17 and is further connected over line 18 to the plate voltage $P_1$ of battery 12.

Control grid 10 is connected to an ionization tube or chamber 19 of otherwise well known configuration, shunted by measuring condenser 20, one electrode of which is also connected to grid 10. The other electrode of condenser 20 and the anode of ionization chamber 19 are connected over line 21 to the normally open contact 22 of relay 17, and, further, over resistor 23 and line 24 to voltage $P_2$ of battery 12 representing a positive reference potential $P_1+P_2$ which is higher than positive potential $P_1$. Contact 25 of relay 17 is connected over line 26 to the normally closed contacts 27 and 28 of a second relay 29 and over line 30 to a positive voltage terminal of battery 12, whereby the positive potential at 30 is higher than the positive potential at 24 which is used as a reference potential.

Relay 29 is actuated by the normally open contacts 31 and 32 of relay 17 and energized by voltage $P_1$ through lines 33, 34, 35 over resistor 36, line 37 and return line 38.

Parallel to relay coil 39 there is arranged condenser 40 which forms with resistor 36 a time delay network to delay the response of relay 29 upon operation of contacts 31, 32. This time delay is of the order of 50 milliseconds, but may of course have any other appropriate characteristic without departing from the scope of this disclosure.

In the following, a sequence of operations leading to the charging of measuring condenser 20 will be described.

Tube 8 is so connected and adjusted that if condenser 20 assumes a certain predetermined potential, caused by the discharging action of the energy source, tube 8 will become conductive and relay coil 16 will be energized. This will close relay contacts 22, 25. At this instance contacts 27, 28 of relay 29 are still closed due to the effect of delay circuits 36, 40. Closing of contacts 22, 25 also shifts the potential of line 21 from positive potential $P_1+P_2$ to the higher positive potential $P_1+P_2+P_3$ for the duration of the above mentioned delay period of 50 milliseconds.

The charging current caused by potential $P_1+P_2+P_3$ flows over condenser 20, grid 10 and cathode 9 of tube 8 back to the negative pole of battery 12. This current charges condenser 20 to potential $P_1+P_2+P_3$, thereby causing tube 8 to act as a rectifier preventing a discharge of condenser 20.

After a time delay to assure complete recharge of the condenser 20 of, say, about 50 milliseconds, relay 29 operates and opens contacts 27 and 28, thereby disconnecting line 21 from line 30 and re-establishing the original connection of lead 21 to potential $P_2$. This shift from potential $P_1+P_2+P_3$ to potential $P_1+P_2$ establishes a potential across the tube 8 in such a manner that its grid 10 becomes negative with respect to cathode 9 by an amount corresponding to potential difference $P_3$. This in turn makes the tube non-conductive and thereby de-energizes relay coil 16 and prepares condenser 20 for another measuring cycle.

For a better understanding of the potential conditions prevailing across measuring condenser 20, and also across tube 8, control grid 10 and cathode 9, the relationship of the various potentials as they appear in sequence of operation is explained.

$P_1$, $P_2$, $P_3$ will be designated as the positive potential differences of a battery or any other regulated D.C. voltage supply, $V_c$ represents the voltage across condenser 20 and $V_g$ the voltage across grid 10 and cathode 9 of the thermionic valve 8.

If potential of grid 10 to cathode 9 is close to zero, the tube becomes conductive and the voltage relation between $V_g$, $V_c$, and the voltages $P_1$, $P_2$ and $P_3$ is as follows:

$$V_g+V_c=P_1+P_2; \ V_g=0$$

consequently $$V_c=P_1+P_2$$

After relay contacts 22, 25 are closed $$V_g+V_c=P_1+P_2+P_3$$

$V_g$ is still 0, because the grid 10 is conductive with respect to the cathode 9, acting as a rectifier for the condenser 20, consequently $$V_c=P_1+P_2+P_3$$

After contacts 27, 28 open $$V_g+P_1+P_2+P_3=P_1+P_2$$

There results $V_g=-P_3$, or as a consequence not only the condenser voltage because of the charge increases from $P_1+P_2$ to $P_1+P_2+P_3$ but also the negative grid to cathode potential has increased from zero to $-P_3$ which makes tube 8 non-conductive and de-energizes relay coil 16.

The ionization current of ionization chamber 19 discharges condenser 20 corresponding to the intensity of this current, until the charge differential corresponding to voltage $P_3$ dissipates which automatically initiates a new recharging cycle as described.

Ionization chamber 19 discharges the condenser 20 with its ionization current and the time of discharge is inversely proportional to the rate of the current.

Ionization chamber 19 is in itself non-conductive by design, incorporating very highly insulated materials, and represent therefore practically an almost infinite resistor.

Incident high energy radiation such as electromagnetic radiation of short wavelength: X-rays or gamma-rays, other radiations which are also able to ionize the gas inside the chamber, like cathode-rays or cosmic radiation render the ionization chamber slightly conductive, thus acting as a resistor of very high resistance.

An ionization chamber has been chosen to explain the circuit of Fig. 2 because it is one of the main applications of measurement.

However, any device, the resistance of which can be affected by any measurable condition, may be connected across the condenser 20. Thus, for example, the generally low conductivity of many materials is affected by their content of humidity which therefore can be measured in this circuit. Also a photo-electric tube becomes conductive when irradiated with light, whereby a certain relationship exists between the intensity of the incident light and the current flowing through the tube. This current can be used to discharge condenser 20 if such tube is connected across it. The circuit can therefore be used to measure the intensity of light, whether visible or not.

These examples, in no way, exhaust the applicability of this circuit for measuring purposes.

Each discharge removes a quantity of electricity which is expressed by $$C_1 \int i \, dt$$

$C_1$ being the capacity of condenser 20 and $i$ the ionization current; and the total quantity Q for $n$ discharges or impulses will amount to $$Q = C_1 n \int i \, dt$$

For the counting of impulses a pulse counter 41 of otherwise known construction is provided which is operated from voltage $P_1$ over line 41, normally open contacts 42, 43 of relay 29 and the lines 44 and 45.

The invention is not limited to the particular circuits, circuit elements and circuit connections shown and described but may be applied in any form or manner whatsoever without departing from the scope of this disclosure.

Having now particularly described the nature of our invention and in which manner the same is to be performed, we declare that what we claim is:

1. In a measuring system, switching means and pulse counting means controlled by said switching means, constant multi-potential supply means, a thermionic discharge tube having a cathode, a highly insulated grid and an anode coupled to said switching means, a condenser connected at one side to said grid and at the other side to a reference potential positive with respect to said cathode, means forming a high resistance leakage path in shunt with said condenser to be measured by the rate of discharge of said condenser, thereby causing said tube at the end of the condenser discharging cycle to operate to control said switching means temporarily to switch the other side of said condenser to a charging potential positive with respect to said cathode and substantially higher than said reference potential thereby recharging said condenser, and causing said tube to operate as a rectifier.

2. System according to claim 1 comprising a resistor connected between said condenser and said constant reference potential, said switching means including means for by-passing said resistor so as to apply to said condenser said charging potential during the charging cycle.

3. System according to claim 2 comprising a delay circuit and additional switching means controlled through said delay circuit by said first switching means, to terminate the charging cycle of said condenser by inserting said resistor so as to restore the reference potential and cause the grid of said tube to be negatively biased with respect to said cathode, thereby causing said tube to become non-conductive and disabling both said switching means.

References Cited in the file of this patent

UNITED STATES PATENTS 2,081,074     Strauss _____ May 18, 1937